US010950263B1

(12) United States Patent
Teo et al.

(10) Patent No.: US 10,950,263 B1
(45) Date of Patent: Mar. 16, 2021

(54) ANGLED AND ELONGATE LIFT TAB FOR MAGNETIC STORAGE DEVICE

(71) Applicant: Western Digital Technologies, Inc., Irvine, CA (US)

(72) Inventors: Kia Moh Teo, San Jose, CA (US); Yanning Liu, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/716,115

(22) Filed: Dec. 16, 2019

(51) Int. Cl.
*G11B 5/48* (2006.01)
*G11B 21/22* (2006.01)
*G11B 21/12* (2006.01)

(52) U.S. Cl.
CPC ............ *G11B 5/4833* (2013.01); *G11B 21/12* (2013.01); *G11B 21/22* (2013.01)

(58) Field of Classification Search
CPC ........ G11B 5/4833; G11B 21/12; G11B 21/22
USPC ................................ 360/255–25.7, 251–257
See application file for complete search history.

(56) References Cited

U.S. PATENT DOCUMENTS

| 6,151,197 | A | 11/2000 | Larson et al. |
| 7,301,730 | B2 | 11/2007 | Lee et al. |
| 7,477,488 | B1* | 1/2009 | Zhang .................. G11B 5/4826 360/245.7 |
| 7,609,483 | B2 | 10/2009 | Deguchl et al. |
| 7,724,476 | B1 | 5/2010 | Bjorstrom et al. |
| 8,105,705 | B2* | 1/2012 | Bai .................. G11B 5/315 428/815 |
| 9,536,552 | B1 | 1/2017 | Chen et al. |
| 2005/0030671 | A1* | 2/2005 | Lee ..................... G11B 5/4826 360/255 |
| 2005/0237670 | A1* | 10/2005 | Fujimoto ............. G11B 5/4833 360/244.2 |
| 2006/0012919 | A1* | 1/2006 | Choi .................... G11B 21/22 360/244.2 |

(Continued)

FOREIGN PATENT DOCUMENTS

| EP | 1555654 | 7/2005 |
| JP | 11306704 | 11/1999 |

(Continued)

OTHER PUBLICATIONS

U.S. Appl. No. 16/823,185, filed Mar. 18, 2020.

(Continued)

*Primary Examiner* — Allen T Cao
(74) *Attorney, Agent, or Firm* — Kanzler Bean & Adamson

(57) ABSTRACT

Disclosed herein is an apparatus that comprises an actuator arm that is pivotably connectable to a pivot post at a proximal end. The actuator arm extends linearly along a first axis from the proximal end to a distal end. The apparatus also comprises a lift tab that comprises an elongate member. The elongate member comprises a proximal end, coupled to the distal end of the actuator arm, and a distal end. The elongate member extends linearly along a second axis from the proximal end to the distal end. The second axis intersects the first axis to define an angle between the first axis and the second axis. The distal end of the elongate member is configured to engage an incline member when the actuator arm is in an unload position to lift the actuator arm.

19 Claims, 5 Drawing Sheets

(56) References Cited

U.S. PATENT DOCUMENTS

2009/0251824 A1   10/2009   Heo et al.
2014/0268426 A1    9/2014   Hardy et al.
2017/0309303 A1   10/2017   Aoki et al.

FOREIGN PATENT DOCUMENTS

| JP | 2000076811 | 3/2000 |
| JP | 2001101814 | 4/2001 |
| JP | 2010146686 | 7/2010 |
| KR | 20030068233 | 8/2003 |
| KR | 100757291 | 9/2007 |

OTHER PUBLICATIONS

Yoon et al., Operational Shock Analysis for 2.5-in Multi-Disk HDD Considering Ramp-Disk Gap Irregularity, IEEE Transactions on Magnetics, Mar. 2017, pp. 1-4, vol. 53, No. 3.
International Search Report and Written Opinion concerning International Application No. PCT/US2020/026121 dated Sep. 11, 2020.

\* cited by examiner

ANGLED AND ELONGATE LIFT TAB FOR MAGNETIC STORAGE DEVICE

FIELD

This disclosure relates generally to magnetic storage devices, and more particularly to an improved lift tab for raising a read/write head off a disk surface of a magnetic storage device.

BACKGROUND

Magnetic storage devices, such as hard disk drives ("HDDs"), are widely used to store digital data or electronic information for enterprise data processing systems, computer workstations, portable computing devices, digital audio players, digital video players, and the like. Generally, HDDs include read-write heads that help facilitate storage of data on magnetic disks. Storage capacity is limited by the area available and the area density capability of the storage elements of the HDD.

SUMMARY

A need exists for a magnetic storage device with an improved lift tab. The subject matter of the present application has been developed in response to the present state of magnetic storage devices, and in particular, in response to problems and needs in the art, such as those discussed above, that have not yet been fully solved by currently available magnetic storage devices. Accordingly, the embodiments of the present disclosure overcome at least some of the shortcomings of the prior art.

Disclosed herein is an apparatus that comprises an actuator arm that is pivotably connectable to a pivot post at a proximal end. The actuator arm extends linearly along a first axis from the proximal end to a distal end. The apparatus also comprises a lift tab that comprises an elongate member. The elongate member comprises a proximal end, coupled to the distal end of the actuator arm, and a distal end. The elongate member extends linearly along a second axis from the proximal end to the distal end. The second axis intersects the first axis to define an angle between the first axis and the second axis. The distal end of the elongate member is configured to engage an incline member when the actuator arm is in an unload position to lift the actuator arm. The preceding subject matter of this paragraph characterizes example 1 of the present disclosure.

A width of the elongate member tapers from the proximal end of the elongate member to the distal end of the elongate member. The preceding subject matter of this paragraph characterizes example 2 of the present disclosure, wherein example 2 also includes the subject matter according to example 1, above.

A width of the elongate member tapers from the proximal end of the elongate member to an intermediate location on the elongate member between the proximal end and the distal end. The width of the elongate member is constant from the intermediate location to the distal end. The preceding subject matter of this paragraph characterizes example 3 of the present disclosure, wherein example 3 also includes the subject matter according to any one of examples 1-2, above.

A thickness of the elongate member tapers from the proximal end of the elongate member to the distal end of the elongate member. The preceding subject matter of this paragraph characterizes example 4 of the present disclosure, wherein example 4 also includes the subject matter according to any one of examples 1-3 above.

The elongate member has a substantially parabolic shape, along a plane perpendicular to the second axis, such that a curved outer surface of the elongate member engages the incline member. The preceding subject matter of this paragraph characterizes example 5 of the present disclosure, wherein example 5 also includes the subject matter according to any one of examples 1-4 above.

The defined angle between the first axis and the second axis is within a range of 10-60 degrees. The preceding subject matter of this paragraph characterizes example 6 of the present disclosure, wherein example 6 also includes the subject matter according to example 5, above.

The defined angle between the first axis and the second axis is 35 degrees. The preceding subject matter of this paragraph characterizes example 7 of the present disclosure, wherein example 7 also includes the subject matter according to example 6, above.

The elongate member is angled away from the actuator arm such that, when the actuator arm is in the unload position and the elongate member is engaged with the incline member, the elongate member is between the incline member and the actuator arm. The preceding subject matter of this paragraph characterizes example 8 of the present disclosure, wherein example 8 also includes the subject matter according to any one of examples 1-7 above.

The distal end of the elongate member is offset from the first axis by a predetermined length along the second axis within a range of 2 mm-4 mm. The preceding subject matter of this paragraph characterizes example 9 of the present disclosure, wherein example 9 also includes the subject matter according to any one of examples 1-8 above.

A ratio of an entire length of the actuator arm to an entire length of the elongate member is within a range of 0.04-0.15. The preceding subject matter of this paragraph characterizes example 10 of the present disclosure, wherein example 10 also includes the subject matter according to any one of examples 1-9 above.

The ratio of the entire length of the actuator arm to the entire length of the elongate member is 0.06. The preceding subject matter of this paragraph characterizes example 11 of the present disclosure, wherein example 11 also includes the subject matter according to example 10, above.

Further disclosed herein is an apparatus that comprises an actuator arm, pivotably connectable to a pivot post at a proximal end. The actuator arm extends linearly along a first axis from the proximal end to a distal end. The apparatus also comprises a read/write head, coupled to the actuator arm. The read/write head is configured to read data from and write data to a disk when the actuator arm is in a load position. The apparatus further comprises a lift tab that comprises an elongate member. The elongate member comprises a proximal end, coupled to the distal end of the actuator arm, and a distal end. The elongate member extends linearly along a second axis from the proximal end to the distal end. The second axis intersects the first axis to define an angle between the first axis and the second axis. The distal end of the elongate member is configured to engage an incline member when the actuator arm is in an unload position to lift the actuator arm such that the read/write head does not sit on the disk. The preceding subject matter of this paragraph characterizes example 12 of the present disclosure.

The apparatus further comprises a suspension assembly that is located between the actuator arm and the lift tab. The suspension assembly is coupled to the distal end of the actuator arm. The proximal end of the lift tab comprises the read/write head. The preceding subject matter of this paragraph characterizes example 13 of the present disclosure, wherein example 13 also includes the subject matter according to example 12, above.

Additionally disclosed herein is a system that comprises a first disk. The system also comprises a first ramp member, located adjacent to the first disk. The first ramp member comprises a sloped face. The system further comprises a first head gimbal assembly corresponding to the first disk. The first head gimbal assembly comprises a first actuator arm, pivotably connectable to a pivot post at a proximal end. The first actuator arm extends linearly along a first axis from the proximal end to a distal end. The first head gimbal assembly also comprises a first read/write head, coupled to the first actuator arm. The first read/write head is configured to read data from and write data to the first disk when the first actuator arm is in a load position. A first head gimbal assembly corresponding to the first disk further comprises a first lift tab. The first lift tab comprises an elongate member that comprises a proximal end, coupled to the distal end of the first actuator arm, and a distal end. The elongate member extends linearly along a second axis from the proximal end to the distal end. The second axis intersects the first axis to define an angle between the first axis and the second axis. The distal end of the elongate member is configured to engage the first ramp member when the first actuator arm is in an unload position to lift the first actuator arm such that the first read/write head does not sit on the first disk. The preceding subject matter of this paragraph characterizes example 14 of the present disclosure.

The first ramp member is offset a distance from the first disk such that the first ramp member does not overlap the first disk. The preceding subject matter of this paragraph characterizes example 15 of the present disclosure, wherein example 15 also includes the subject matter according to example 14, above.

The distance that the first ramp member is offset from the first disk is within a range of 0.1 mm-0.5 mm. The preceding subject matter of this paragraph characterizes example 16 of the present disclosure, wherein example 16 also includes the subject matter according to example 15, above.

A length of the elongate member of the first lift tab is greater than the distance of the first ramp member from the first disk. The preceding subject matter of this paragraph characterizes example 17 of the present disclosure, wherein example 17 also includes the subject matter according to any one of examples 14-16 above.

At least a portion of the first read/write head overlaps the first disk, in a direction perpendicular to the first axis, while the first lift tab is engaged with the first ramp member when the first actuator arm is in the unload position. The preceding subject matter of this paragraph characterizes example 18 of the present disclosure, wherein example 18 also includes the subject matter according to any one of examples 14-17 above.

The system further comprises a plurality of disks, including the first disk. The disks of the plurality of disks are adjacent to one another and spaced apart from one another by a predefined distance. The system also comprises a ramp structure comprising a plurality of ramp members that comprise the first ramp member. The system additionally comprises a plurality of head gimbal assemblies that comprises the first head gimbal assembly. Each head gimbal assembly corresponding to one of the plurality of disks. The preceding subject matter of this paragraph characterizes example 19 of the present disclosure, wherein example 19 also includes the subject matter according to any one of examples 14-18 above.

The plurality of head gimbal assemblies comprises at least two head gimbal assemblies. One gimbal assembly faces a first disk of the plurality of disks and another gimbal assembly faces a second disk of the plurality of disks adjacent to the first disk such that the at least two head gimbal assemblies are located adjacent to one another between the first disk and the second disk. When the at least two head gimbal assemblies are engaged with corresponding ramp members of the ramp structure, a clearance between the at least two head gimbal assemblies is within a range of 0.05 mm-1 mm. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
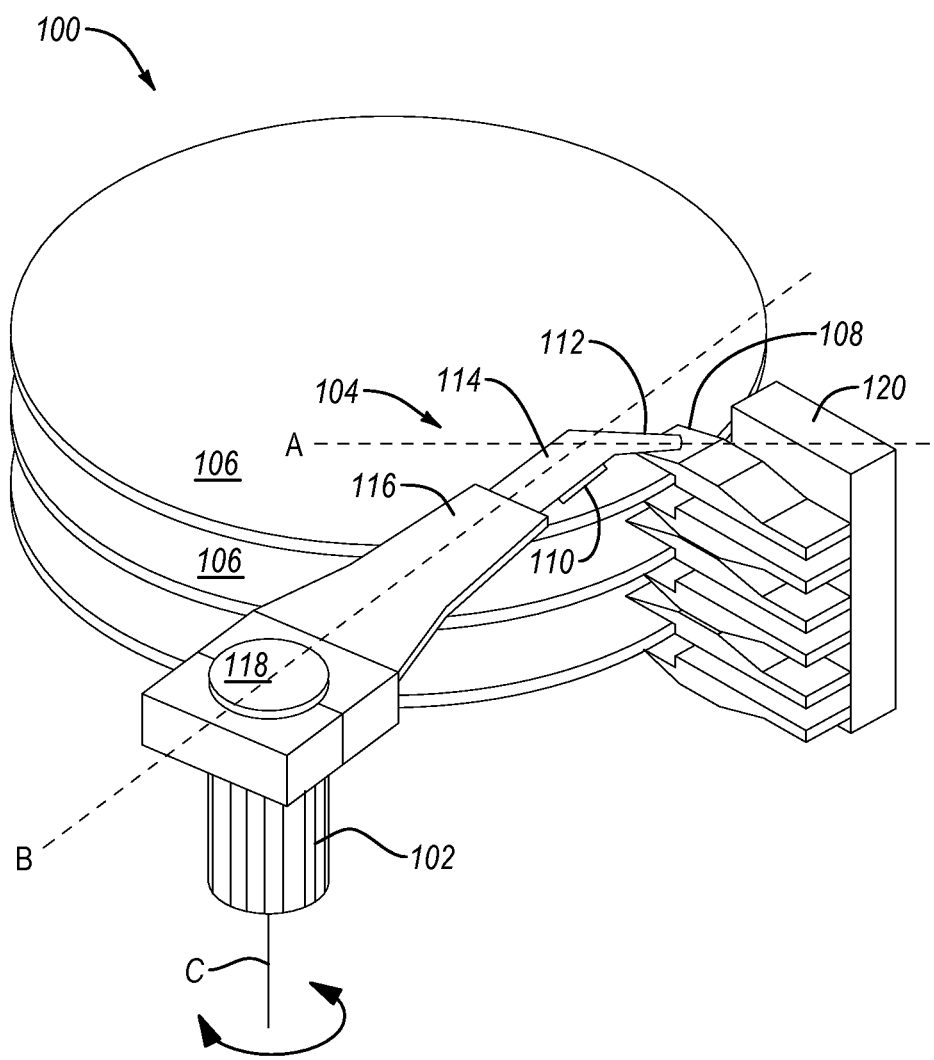
FIG. 1 is a perspective view of a magnetic storage device, according to one or more examples of the present disclosure.

Referring to FIG. 1, a magnetic storage device 100 (e.g., magnetic recording device), according to one embodiment, is depicted as a hard disk drive ("HDD"). However, in other embodiments, the magnetic storage device 100 can be any of various magnetic storage devices without departing from the essence of the subject matter of the present disclosure. FIG. 1, in certain embodiments, shows at least a portion of the internal components of a load/unload type of magnetic storage device 100. As used herein, a load/unload type magnetic storage device 100 includes an actuator arm 116 that includes a read/write head for reading and/or writing data from/to the disk 106 by loading the read/write head on the disk 106 to perform read/write operations and unloading the read/write head from the disk 106 and onto a ramp member 108 such that the read/write head does not sit on the disk.

The magnetic storage device 100, in one embodiment, includes a rotary actuator 102 for actuating a pivot post 118. The magnetic storage device 100 includes magnetic data storage disks 106 and a load/unload ramp 108. The magnetic disk 106 has a surface capable of storing magnetically stored data that can be read by a read/write head. The load/unload ramp 108 provides for loading and unloading of the read/write head from the magnetic disks 106. The rotary actuator 102 rotates the head gimbal assembly 104 about the pivot post 118 along axis C. The head gimbal assembly 104 is aligned so that the lift tab 112 contacts the ramp 108 when the rotary actuator 102 rotates the head gimbal assembly 104 to its outermost position.

In one embodiment, an actuator arm 116 supports or is coupled with a suspension assembly 114, which is attached to a distal end of the actuator arm 116 and extends forward from the actuator arm 116. The suspension assembly 114 can be, for example, made of stainless steel and use a gimbal spring (not shown) to cantilever the slider 110 and a lift tab 112 at the distal end of the suspension assembly 114. A magnetic read/write head (not shown) is located on a bottom surface of the slider 110. In one embodiment, at least a portion of the actuator arm 116, the suspension assembly 114, the slider 110, the read/write head, and the lift tab 112 comprise a head gimbal assembly 104. The actuator arm 116 and the suspension assembly 114 may comprise a single, monolithic unit such that the suspension assembly 114 is not separate from the actuator arm 116.

The suspension assembly 114, in one embodiment, supports a wiring part connected to the slider 110 through a lead, etc. The wiring part is small and omitted in FIG. 1. The sense current, read-in data, and read-out data are supplied and output between the read/write head and the wiring part through such a lead. The suspension assembly 114 applies an elastic force to the slider 110 and the lift tab 112 against the surface of the magnetic disk 106.

The lift tab 112 is positioned on the actuator arm 116 and/or suspension assembly 114 so that it engages a ramp 108 on a ramp structure 120. The ramp 108 has a sloped or inclined surface that imparts an upward force on the lift tab 112, which lifts the slider 110 and the magnetic read/write head away from the disk 106. The magnetic read/write head is thereby not in contact with the disk 106 when the lift tab 112 is moved onto the ramp 108, e.g., is in an unload state, position, or location. For the lift tab 112 to lift the slider 110 from the disk 106, the lift tab 112 rubs or slides against a sloped or inclined surface of the ramp 108 when the actuator arm 116 is moved into an unload position. The ramp structure 120 may include multiple ramps 108 that correspond to multiple different actuator arms 116. For instance, each disk 106 may have at least two corresponding actuator arms 116 for positioning read/write heads on both surfaces of the disk 106.

The lift tab 112 extends along a linear axis A to serve as an engagement part with the ramp 108. In one embodiment, the lift tab 112 is integrated with the actuator arm 116 and/or the suspension assembly 114 and is made of the same material as that of the actuator arm 116 and/or suspension assembly 114. The lift tab 112 slides on the ramp 108 and serves to load and unload the slider 110. In other words, the lift tab 112 loads the slider 110 from the ramp 108 over the magnetic disk 106 after driving of the magnetic disk 106 starts, and unloads the slider 110 from the magnetic disk 106 to the ramp 108 so as to hold the slider 110 on the ramp 108 before driving of the magnetic disk 106 stops. The ramp 108 and ramp structure 120, in certain embodiments, are made from low-friction polymer materials.

Figure 2:
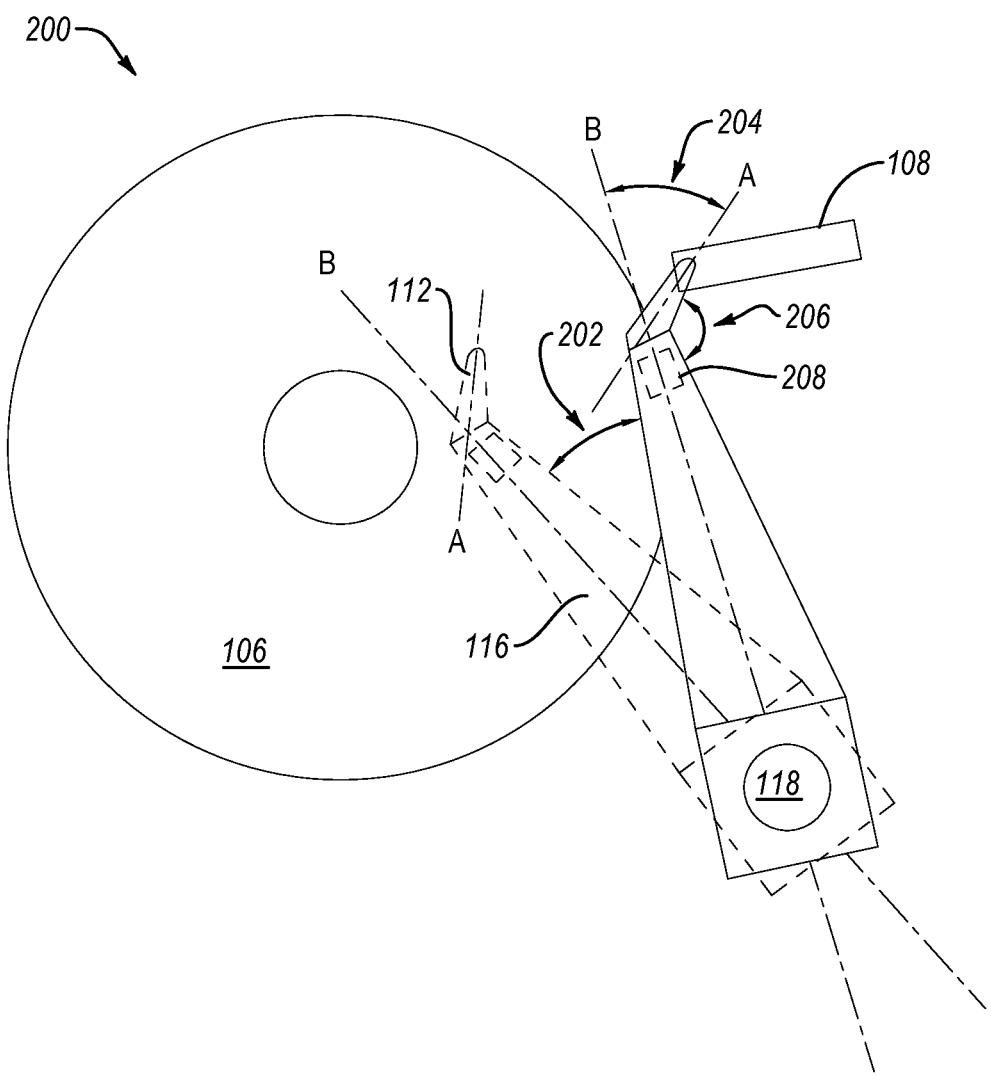
FIG. 2 is a top plane view of components of a magnetic storage device, according to one or more examples of the present disclosure.

FIG. 2 is a view of a magnetic storage device 200, according to one or more examples of the present disclosure. In one embodiment, the magnetic storage device 200 illustrated in FIG. 2 is substantially similar to the magnetic storage device 100 illustrated in FIG. 1.

In one embodiment, the magnetic storage device 200 includes a head gimbal assembly 104 that includes an actuator arm 116 that is coupled to a pivot post 118. The actuator arm 116 includes a read/write head 208, located on a side of the actuator arm 116 that faces the disk 106, for reading and/or writing data from/to the disk 106. The actuator arm 116 includes a lift tab 112 that is configured to engage a ramp member 108 when the actuator arm 116 is in an unload position—a position where the read/write head 208 does not sit on the disk 106 and is not being used for reading data and/or writing data from/to the disk 106.

The actuator arm 116 is configured to radially pivot about the pivot post 118, by means of an actuator 102, along a radial axis 202 between a load position—a position where the read/write head 208 sits on the disk 106 to read/write data from/to the disk 106, and the unload position. Furthermore, when the actuator arm 116 is in the unload position where the lift tab 112 engages the ramp member 108, the read/write head 208 overlaps at least a portion of the disk 106 in a direction perpendicular to the axis B that the actuator arm 116 extends along.

Due to the shape and configuration of the lift tab 112, the ramp member 108 is offset from the disk 106 by a certain distance so that the ramp member 108 does not overlap the disk 106, which allows the read/write head 208 to service the outer dimension, edge, circumference of the disk 106 for reading and storing data. Furthermore, because the ramp member 108 does not overlap the disk 106, the reliability of the disk 106 is increased because debris and dust that may be created by repeated engagement of the lift tab 112 with the ramp member 108 does not fall onto the disk 106. Similarly, the shock reliability of the magnetic storage device 200 can also be improved because shock contacts between the disk 106 and the ramp 108 can be eliminated. In some embodiments, the distance that the ramp 108 is offset or set back from the disk 106 is within a range of 0.1 mm-0.5 mm and may be 0.3 mm. In such an embodiment, the length of the elongate member 402 of the lift tab 112 is greater than the distance of the ramp 108 from the disk 106.

The lift tab 112 is an elongate member 402 (see FIGS. 4A-4C) that extends linearly along an axis A that intersects or crosses with the linear axis B that the actuator arm 116 extends along. In such an embodiment, the intersection of the axes A, B forms an outer angle 204 between the axis A, B and an inner angle 206 between the lift tab 112 and the actuator arm 116 where the lift tab 112 angles away from the actuator arm 116 such that the elongate member 402 of the lift tab 112 is between the ramp member 108 and the actuator arm 116. The distal end 406 of the elongate member engages the ramp member 108 to lift the read/write head 208 off the disk surface while it is not used for reading and/or writing data.

In one embodiment, the angle 206 defined between the lift tab 112 and the actuator arm 116 is between 90 and 170 degrees. In certain embodiments, the angle 206 defined between the lift tab 112 and the actuator arm 116 is within a range of 120-150 degrees. In some embodiments, the angle 206 defined between the lift tab 112 and the actuator arm 116 is 135 degrees. In one embodiment, the outer angle 204, opposite the inner angle 206, defined between the linear axes A, B is between 10 and 90 degrees. In further embodiments, the outer angle 204 defined between the linear axes A, B is between 30 and 70 degrees. In some embodiments, the outer angle 204 defined between the linear axes A, B is 45 degrees. As used herein, an angle defined between two features is an angle greater than, and not including, 0 degrees and less than, and not including, 360 degrees.

In one embodiment, the distal end 406 of the elongate member 402 of the lift tab 112 is offset from the linear axis B by a predetermined length along the axis A within a range of 2 mm-4 mm. In certain embodiments, a ratio of an entire length of the actuator arm 116 to an entire length of the elongate member 402 of the lift tab 112 is within a range of 0.04-0.15. In one embodiment, the ratio of the entire length of the actuator arm 116 to the entire length of the elongate member 402 of the lift tab is 0.06

In certain embodiments, the magnetic storage device 200 includes multiple storage disks 106, as shown in FIG. 1, with multiple corresponding gimbal head assemblies 104. In such an embodiment, the disks 106 may be stacked or located adjacent to one another. Gimbal head assemblies 104 that include actuator arms 116 with read/write heads 208 may be located above and below a disk 106 to read/write data from/to both surfaces of the disk 106. Thus, in between disks 106, actuator arms 116 may be located back-to-back, with one reading a surface of a first disk 106 and the other reading an opposing surface of a second disk 106.

In such an embodiment, the ramp structure 120 may include multiple ramps 108 for engaging the lift tab 112 of each actuator arm 116 when the read/write heads are not being used to read/write data. Accordingly, the actuator arms 116 between disks 106 that are located back-to-back may have a certain amount of clearance between them when the lift tab 112 for each actuator arm 116 engages the corresponding ramp 108 when the actuator arms 116 are in an unload position. The range of the clearance between the actuator arms 116 that are located between disks 106 may be within a range of 0.05 mm-1 mm. The clearance, in one embodiment, between the actuator arms 116 that are located between disks 106 is 0.525 mm.

Figure 3A:
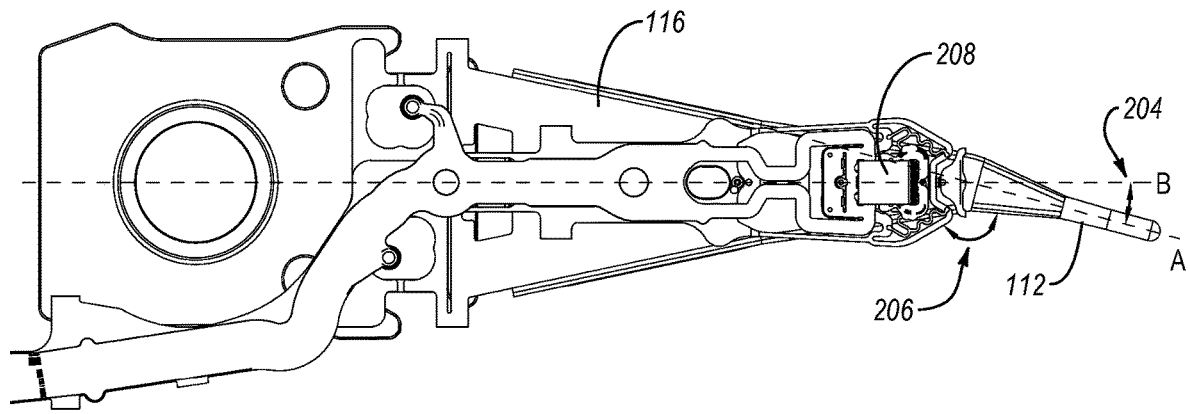
FIG. 3A is a bottom plan view of a head gimbal assembly, according to one or more examples of the present disclosure.

FIG. 3A is a view of a gimbal head assembly 104 comprising an actuator arm 116 with a lift tab 112, according to one or more examples of the present disclosure. FIG. 3C is a perspective view of the gimbal head assembly 104 illustrated in FIG. 3A. In one embodiment, the actuator arm 116 includes a read/write head 208 for reading/writing data from/to a disk 106. As described above, the lift tab 112 extends along an axis A that intersects the axis B that the actuator arm is located along to form an angle 204 between the lift tab 112 and the axis B and a corresponding angle 206 between the lift tab 112 and the actuator arm 116.

The delineation between the lift tab 112 and the actuator arm 116 is defined by where the axis A that the lift tab extends along intersects the axis B that the actuator arm 116 extends along. In other embodiments, the delineation between the lift tab 112 and the actuator arm 116 is where the lift tab 112 couples to the actuator arm 116. Either way, the lift tab 112 angles away from the actuator arm 116 along axis A so that the read/write head 208 overlaps a disk 106 while the actuator arm 116 is in an unload position where the lift tab 112 engages a ramp 108.

Figure 3B:
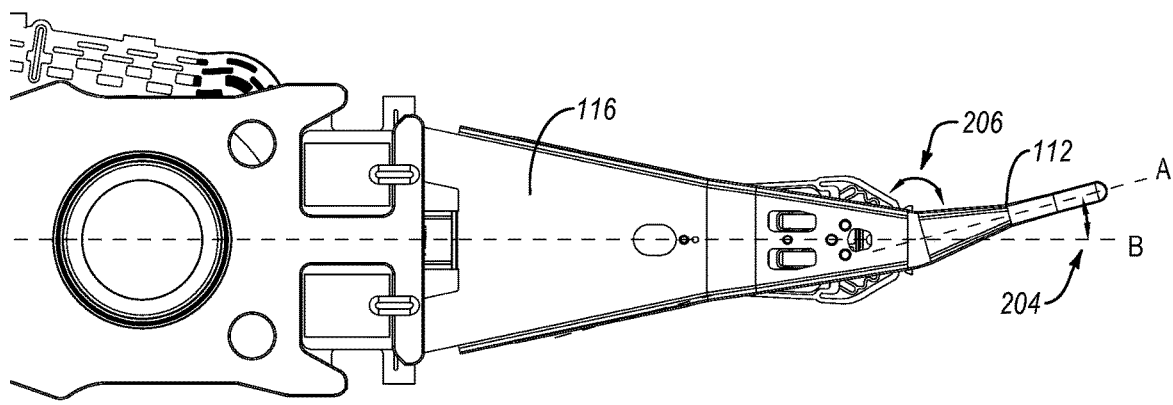
FIG. 3B is a top plan view of the other side of the head gimbal assembly of FIG. 3A, according to one or more examples of the present disclosure.
Figure 3C:
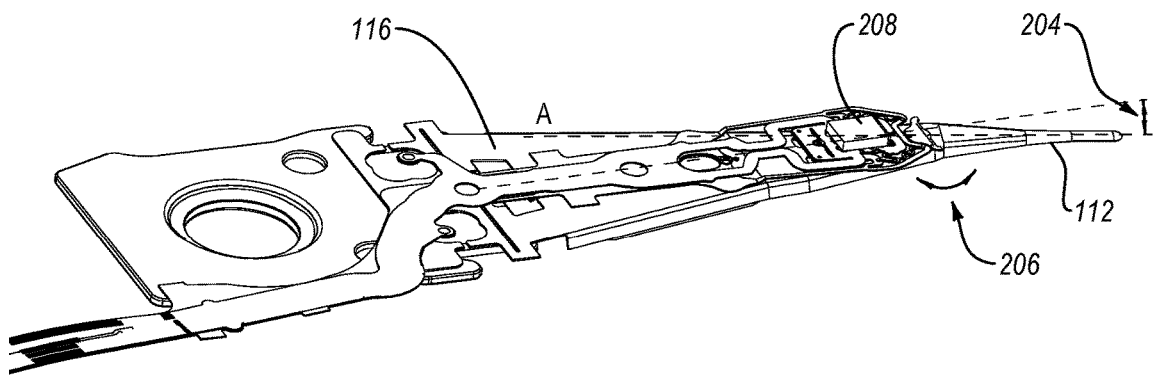
FIG. 3C is a perspective view of the head gimbal assembly of FIGS. 3A and 3B, according to one or more examples of the present disclosure.
Figure 3D:
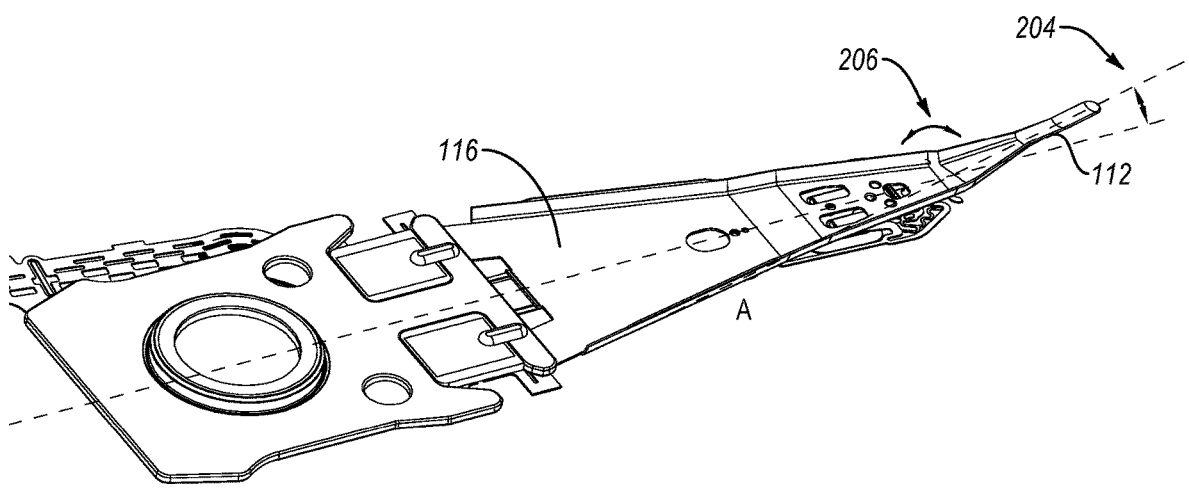
FIG. 3D is a perspective view of the head gimbal assembly of FIGS. 3A and 3B, according to one or more examples of the present disclosure.

FIG. 3B is a view of the other side of the gimbal head assembly 104 of FIG. 3A, according to one or more examples of the present disclosure. FIG. 3B illustrates the opposing view of FIG. 3A with the lift tab 112 angled away from the actuator arm 116 be an angle 204, 206 defined by the intersection of the linear axes A, B that the lift tab 112 and the actuator arm 116 extend along, respectively. FIG. 3D is a perspective view of the gimbal head assembly 104 illustrated in FIG. 3B.

As can be seen in FIGS. 3C and 3D, the actuator arm 116 and/or the lift tab 112 has a substantially parabolic shape, e.g., like a boat, along a plane perpendicular to the axes A, B. In such an embodiment, the parabolic outer surface of the lift tab 112 is configured to engage a ramp 108 to lift or raise the actuator arm 116 and the read/write head 208 off of the surface of a disk 106 while the read/write head 208 is not being used to read/write data from/to the disk 106.

Figure 4A:
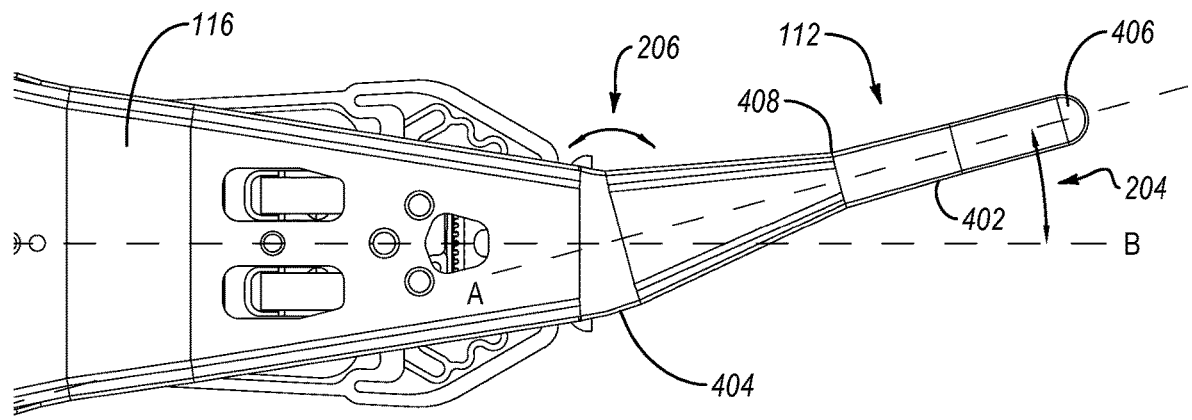
FIG. 4A is a top plan view of a lift tab, according to one or more examples of the present disclosure.

FIG. 4A is a view of a lift tab 112, according to one or more examples of the present disclosure. The lift tab 112 includes an elongate member 402, that includes a proximal end 404, connected to the actuator arm 116 and a distal end 406 that is configured to engage an inclined or sloped surface of a ramp 108 when the actuator arm 116 is in an unload state or position.

In certain embodiments, the lift tab 112 and the actuator arm 116 are formed of a single, monolithic unit. In such an embodiment, the delineation between the actuator arm 116 and the proximal end of the elongate member 402 is where the axis B that the actuator arm 116 extends along intersects the axis A that the lift tab 112 extends along. In some embodiments, the lift tab 112 and the actuator arm 116 are two separate pieces that are coupled together at the proximal end 404 of the elongate member 402. In such an embodiment, the delineation between the lift tab 112 and the actuator arm 116 is where the lift tab 112 and the actuator arm 116 are coupled.

Either way, the elongate member 402 extends along an axis A that angles away from the axis B that the actuator arm 116 extends along to form an angle 206 between the elongate member 402 and the actuator arm 116 and a corresponding angle 204 between the elongate member and the axis B that the actuator arm 116 extends along. The angles 204, 206 may be within the ranges of 10-70 and 110-170, respectively.

In one embodiment, the width of the elongate member 402 tapers, narrows, or thins from the proximal end 404 of the elongate member 402 to the distal end 406 of the elongate member 402. In further embodiments, the width of the elongate member 402 tapers from the proximal end 404 of the elongate member to an intermediate location 408 of the elongate member 402 between the proximal end 404 and the distal end 406. In such an embodiment, the width of the elongate member 402 is constant from the intermediate location 408 to the distal end 406.

In one embodiment, the elongate member 402 has a length within a range of 2 mm-4 mm, such as 3 mm. In further embodiments, the length of the elongate member 402 is determined relative to a length of the actuator arm 116, relative to a distance between the disk and the ramp 108, and/or the like. For instance, the ratio of the entire length of the actuator arm 116 to an entire length of the elongate member 402 may be within a range of 0.04-0.15, such as 0.06.

Figure 4B:
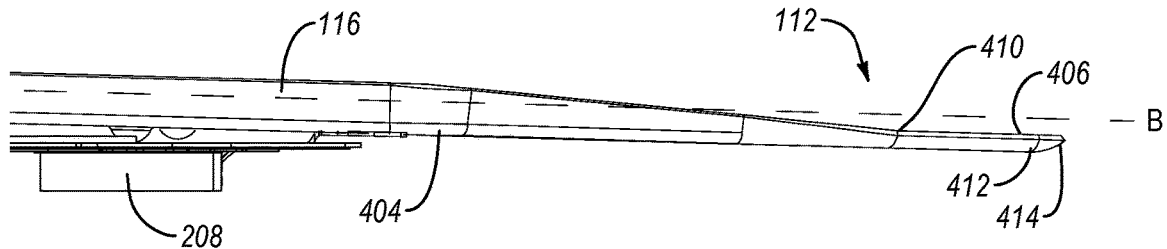
FIG. 4B is a side elevation view of the lift tab of FIG. 4A, according to one or more examples of the present disclosure.

FIG. 4B is a side view of the lift tab of FIG. 4A, according to one or more examples of the present disclosure. In one embodiment, the thickness of the elongate member 402 tapers, narrows, or thins from the proximal end 404 to the distal end 406 of the elongate member 402. In one embodiment, the thickness of the elongate member 402 tapers from the proximal end 404 to an intermediate location 410 and the thickness of the elongate member 402 is substantially constant from the intermediate location 410 to the distal end 406.

In one embodiment, the distal end 406, which engages the ramp 108 when the actuator arm 116 is in an unload position, includes a nub 412 or other expansion for engaging the ramp 108 that has a rounded surface and a bigger thickness than the preceding portion of the elongate member 402. The nub 412 may have an angled face or surface 414 that is configured to directly engage the inclined or sloped surface of the ramp 108 to assist sliding the distal end 406 of the elongate member 402 up the surface of the ramp 108 to raise the read/write head 208 of the actuator arm 116 off of the surface of a disk 106.

Figure 4C:
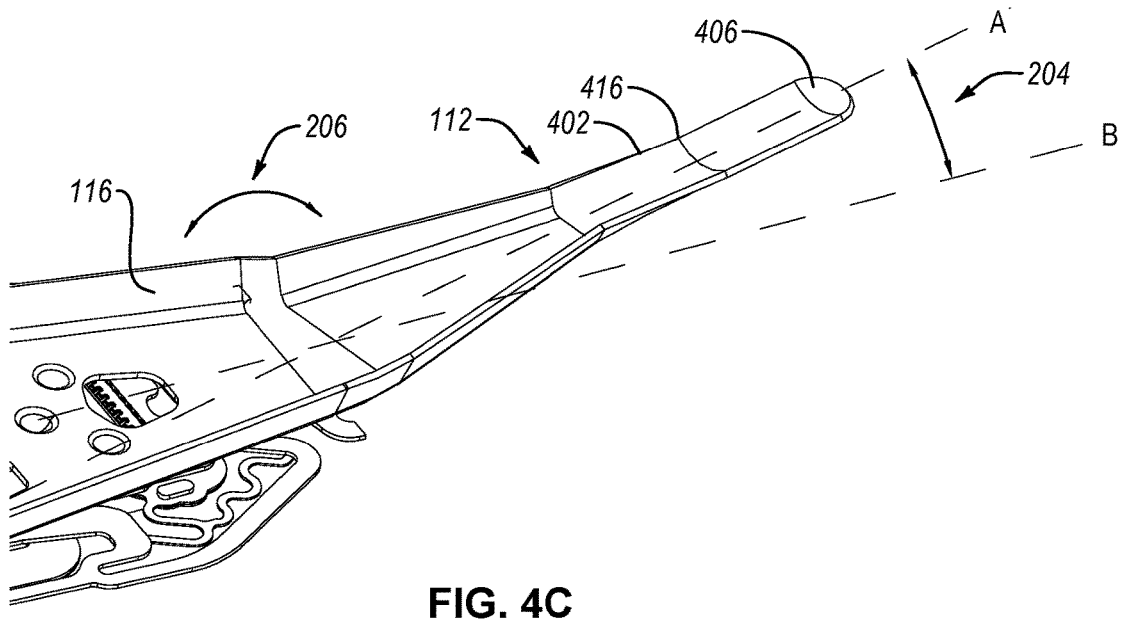
FIG. 4C is a perspective view of the lift tab of FIGS. 4A and 4B, according to one or more examples of the present disclosure.

FIG. 4C is a perspective view of the lift tab of FIGS. 4A and 4B, according to one or more examples of the present disclosure. In one embodiment, the lift tab 112 has a substantially parabolic shape, e.g., like a boat, such that the outer surface of the lift tab 112 is rounded in a U-shaped cross-section. The parabolic shape assists the elongate member 402 to slide up and down the ramp 108 when the actuator arm 116 is moved between a load and unload state/position. The parabolic shape may also provide structural support for the lift tab 112 to compensate for the length of the lift tab 112.

As can be seen in FIG. 4C, a height of the sides or "walls" of the elongate member 402 taper, narrow, or thin along the length of the elongate member 402 from the proximal end 404 to the distal end 406. In some embodiments, the height of the sides or "walls" of the elongate member 402 taper, narrow, or thin along the length of the elongate member 402 from the proximal end 404 to an intermediate location 416. From the intermediate location 416 to the distal end 406, the height of the sides or "walls" of the elongate member 402 are constant.

In the above description, certain terms may be used such as "up," "down," "upper," "lower," "horizontal," "vertical," "left," "right," "over," "under" and the like. These terms are used, where applicable, to provide some clarity of description when dealing with relative relationships. But these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus, comprising:
   an actuator arm, pivotably connectable to a pivot post at a proximal end, the actuator arm extending linearly along a first axis from the proximal end to a distal end; and
   a lift tab, comprising an elongate member, the elongate member comprising:
      a proximal end, coupled to the distal end of the actuator arm, and
      a distal end, the elongate member extending linearly along a second axis from the proximal end to the distal end, the second axis intersecting the first axis to define an angle between the first axis and the second axis, the distal end of the elongate member configured to engage an incline member when the actuator arm is in an unload position to lift the actuator arm from a disk, the incline member offset a distance from the disk such that the incline member does not overlap the disk, the elongate member having a length greater than a distance of the incline member from the disk.

2. The apparatus of claim 1, wherein a width of the elongate member tapers from the proximal end of the elongate member to the distal end of the elongate member.

3. The apparatus of claim 1, wherein:
   a width of the elongate member tapers from the proximal end of the elongate member to an intermediate location on the elongate member between the proximal end and the distal end; and
   the width of the elongate member is constant from the intermediate location to the distal end.

4. The apparatus of claim 1, wherein a thickness of the elongate member tapers from the proximal end of the elongate member to the distal end of the elongate member.

5. The apparatus of claim 1, wherein the elongate member has a substantially parabolic shape, along a plane perpendicular to the second axis, such that a curved outer surface of the elongate member engages the incline member.

6. The apparatus of claim 5, wherein the defined angle between the first axis and the second axis is within a range of 10-60 degrees.

7. The apparatus of claim 6, wherein the defined angle between the first axis and the second axis is 35 degrees.

8. The apparatus of claim 1, wherein the elongate member is angled away from the actuator arm such that, when the actuator arm is in the unload position and the elongate member is engaged with the incline member, the elongate member is between the incline member and the actuator arm.

9. The apparatus of claim 1, wherein the distal end of the elongate member is offset from the first axis by a predetermined length along the second axis within a range of 2 mm-4 mm.

10. The apparatus of claim 1, wherein a ratio of an entire length of the actuator arm to an entire length of the elongate member is within a range of 0.04-0.15.

11. The apparatus of claim 10, wherein the ratio of the entire length of the actuator arm to the entire length of the elongate member is 0.06.

12. An apparatus, comprising:
   an actuator arm, pivotably connectable to a pivot post at a proximal end, the actuator arm extending linearly along a first axis from the proximal end to a distal end;
   a read/write head, coupled to the actuator arm, the read/write head configured to read and write data from/to a disk when the actuator arm is in a load position; and
   a lift tab, comprising an elongate member, the elongate member comprising:
      a proximal end, coupled to the distal end of the actuator arm, and
      a distal end, the elongate member extending linearly along a second axis from the proximal end to the distal end, the second axis intersecting the first axis to define an angle between the first axis and the second axis, the distal end of the elongate member configured to engage an incline member when the actuator arm is in an unload position to lift the actuator arm such that the read/write head does not sit on the disk, the incline member offset a distance from the disk such that the incline member does not overlap the disk, the elongate member having a length greater than a distance of the incline member from the disk.

13. The apparatus of claim 12, further comprising a suspension assembly, located between the actuator arm and the lift tab, wherein the suspension assembly:
   is coupled to the distal end of the actuator arm and the proximal end of the lift tab; and
   comprises the read/write head.

14. A system, comprising:
   a first disk;
   a first ramp member, located adjacent to the first disk, the first ramp member comprising a sloped face;

a first head gimbal assembly corresponding to the first disk, comprising:
  a first actuator arm, pivotably connectable to a pivot post at a proximal end, the first actuator arm extending linearly along a first axis from the proximal end to a distal end;
  a first read/write head, coupled to the first actuator arm, the first read/write head configured to read and write data from/to the first disk when the first actuator arm is in a load position; and
  a first lift tab, comprising an elongate member, the elongate member comprising a proximal end, coupled to the distal end of the first actuator arm, and a distal end, the elongate member extending linearly along a second axis from the proximal end to the distal end, the second axis intersecting the first axis to define an angle between the first axis and the second axis, the distal end of the elongate member configured to engage the first ramp member when the first actuator arm is in an unload position to lift the first actuator arm such that the first read/write head does not sit on the first disk, the first ramp member offset a distance from the first disk such that the first ramp member does not overlap the first disk.

15. The system of claim 14, wherein the distance that the first ramp member is offset from the first disk is within a range of 0.1 mm-0.5 mm.

16. The system of claim 14, wherein a length of the elongate member of the first lift tab is greater than the distance of the first ramp member from the first disk.

17. The system of claim 14, wherein at least a portion of the first read/write head overlaps the first disk, in a direction perpendicular to the first axis, while the first lift tab is engaged with the first ramp member when the first actuator arm is in the unload position.

18. The system of claim 14, further comprising:
  a plurality of disks, comprising the first disk, wherein the plurality of disks are adjacent to one another and spaced apart from one another by a predefined distance;
  a ramp structure comprising a plurality of ramp members, the plurality of ramp members comprising the first ramp member; and
  a plurality of head gimbal assemblies, comprising the first head gimbal assembly, each head gimbal assembly corresponding to one of the plurality of disks.

19. The system of claim 18, wherein the plurality of head gimbal assemblies comprises at least two head gimbal assemblies, one facing a first disk of the plurality of disks, one facing a second disk of the plurality of disks adjacent to the first disk such that the at least two head gimbal assemblies are located adjacent to one another between the first disk and the second disk, wherein when the at least two head gimbal assemblies are engaged with corresponding ramp members of the ramp structure, a clearance between the at least two head gimbal assemblies is within a range of 0.05 mm-1 mm.

* * * * *